United States Patent

[11] 3,524,395

| [72] | Inventor | Alfred Victor Alasia<br>Whitestone, N.Y. |
|---|---|---|
| [21] | Appl. No. | 802,321 |
| [22] | Filed | Feb. 12, 1969 |
| [45] | Patented | Aug. 18, 1970<br>Continuation of Ser. No. 678,773, filed Oct. 18, 1967, which is a continuation of Ser. No. 453,082, filed May 4, 1965. |
| [73] | Assignee | One-half to Leo Rashkin<br>Beechurst, New York |

[54] THREE DIMENSIONAL CAMERA
11 Claims, 9 Drawing Figs.
[52] U.S. Cl. .................................................. 95/18
[51] Int. Cl. .............................................. G03b 35/04
[50] Field of Search ........................................ 95/18, 86

[56] References Cited
UNITED STATES PATENTS
2,562,077  7/1951  Winnek ..................... 95/18

Primary Examiner— John M. Horan
Attorney— Robert J. Schiller

ABSTRACT: A three dimensional camera is provided in which a series of exposures are made onto a film having a lenticular screen. The film orientation is continuously varied with respect to the subject so as to present a series of viewing aspects. The path followed by the film orientation has a curvature in which the distance between any point on the path and the lens is greatest at the ends and decreases to minimum towards the center. A simple three dimensional camera is also disclosed utilizing a masked lens to define a horizontal slit and has a moving vertical shutter aperture. A lenticular surface is provided in front of the film.

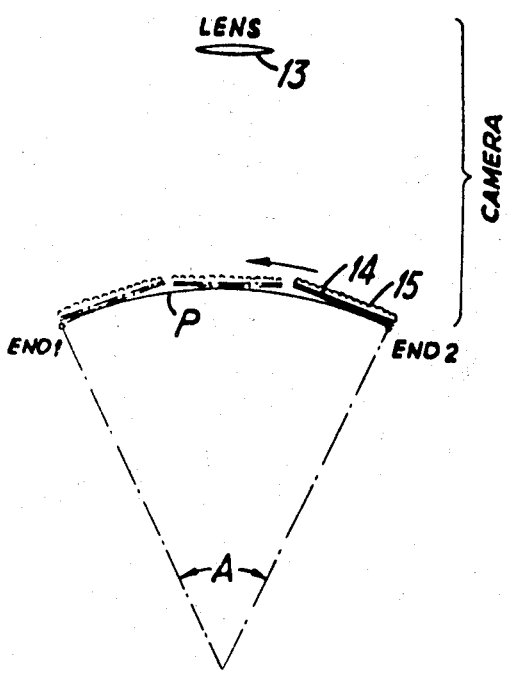
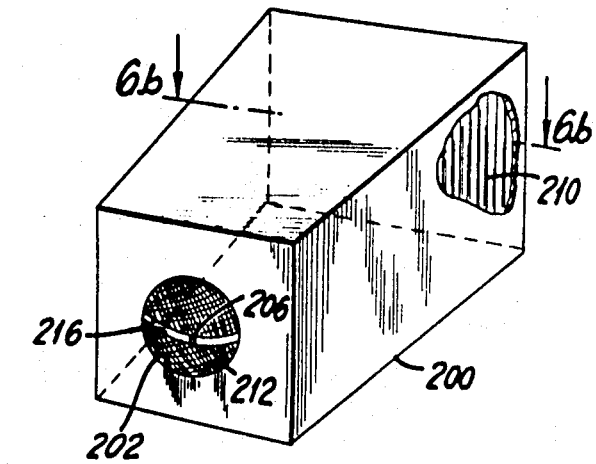
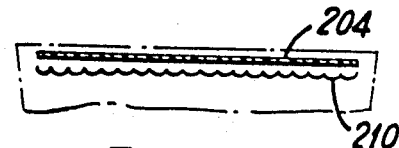
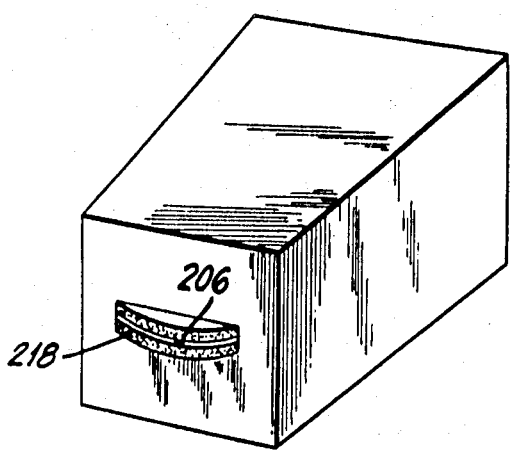
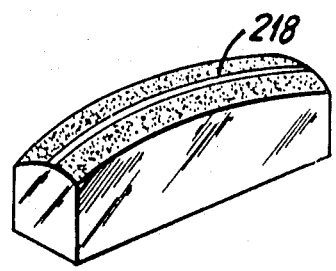
FIG.1
FIG.6a
FIG.6b
FIG.7a
FIG.7b
INVENTOR.
ALFRED VICTOR ALASIA
BY
Hopgood & Calimafde
ATTORNEYS.

INVENTOR.
ALFRED VICTOR ALASIA
BY
Hopgood & Calimafde
ATTORNEYS.

INVENTOR.
ALFRED VICTOR ALASIA

Patented Aug. 18, 1970

INVENTOR.
ALFRED VICTOR ALASIA

BY
Hopgood & Calimafde
ATTORNEYS.

THREE DIMENSIONAL CAMERA

This is a continuation of my parent application, Serial No. 678,773, filed October 18, 1967, which in turn was a continuation of my parent application, Serial No. 453,082, filed May 4, 1965, now abandoned.

This invention relates to a three dimensional camera. More particularly this invention relates to a three dimensional camera in which a series of distinct exposures are made onto a single film through a lenticular screen. In a preferred embodiment, it will be shown that the camera is moved to effect a different viewing aspect of the subject for each exposure.

Prior stereoscopic or three dimensional cameras have utilized movement of the film in order to achieve multiple viewing aspects. Such cameras have been of the bellows type comprising in general a lens holder (and lens), a film back in which film may be removably inserted and a bellows between the lens holder and film back to effect a light sealed unit. The film back carried means for positioning a lenticular screen in front of the film. These cameras, per se, are well known to the art and their structure (shutters, lens system, etc.) will not be described in detail in this application.

In order to achieve multiple viewing aspects with this camera, prior skilled workers have rotated the entire camera in wide arcs about either the subject or some other point between the camera and the subject. In terms of physical distances such scans may have included well over 5' of movement. This system necessitated large supporting and scanning structures.

Other skilled workers have rotated the film back with respect to the lens in somewhat similar arcs.

All prior systems while achieving a three dimensional photographic effect have either involved massive equipment limiting field or on-location shots; or have produced pictures which are not sharp; or have produced pictures in which the main subject is sharp, but in which the background jumps objectionably.

It will be observed that many of these deficiencies are interrelated. Sharpness may be increased by fewer exposures or shorter scans, but this will decrease the stereoscopic effect. Background jumping can be reduced by limiting scan but this is at the direct expense of stereoscopic effect. System size and complexity can be reduced with shorter scans but this reduces the difference in viewing aspects which also equally reduces the depth or quality of the stereoscopic effect. The purpose of this invention is to achieve a high quality system for professional use; however, by the use of principles of multiple exposures onto a lenticular screen, a simple box camera can be obtained.

An object of this invention is to provide a stereoscopic camera system which reduces or eliminates the foregoing disadvantages of prior systems.

It is a specific object of this invention to provide a smaller "on-locution" stereoscopic camera.

It is another object of this invention to provide a stereoscopic camera which produces sharp subject exposure with a minimum of background jumping.

It is still another object of this invention to provide a simple three dimensional camera.

The above mentioned and other features and objects of this invention and the manner of attaining them will become more apparent and the invention itself will best be understood by reference to the following description of an embodiment of the invention taken in conjunction with the accompanying drawings wherein:

FIG. 1 is a diagrammatic view illustrating the reverse scan path of the film pack of my novel three dimensional camera system;

FIG. 6a is a diagram of a simple three dimensional camera;

FIG. 6b is a sectional view showing the film and lenticular screen in front thereof;

FIG. 7a is a diagrammatic view of an alternative emobdiment of FIG. 6a;

FIG. 7b is a perspective view of the lens wedge used in the camera of FIG. 7a.

Figure 2:
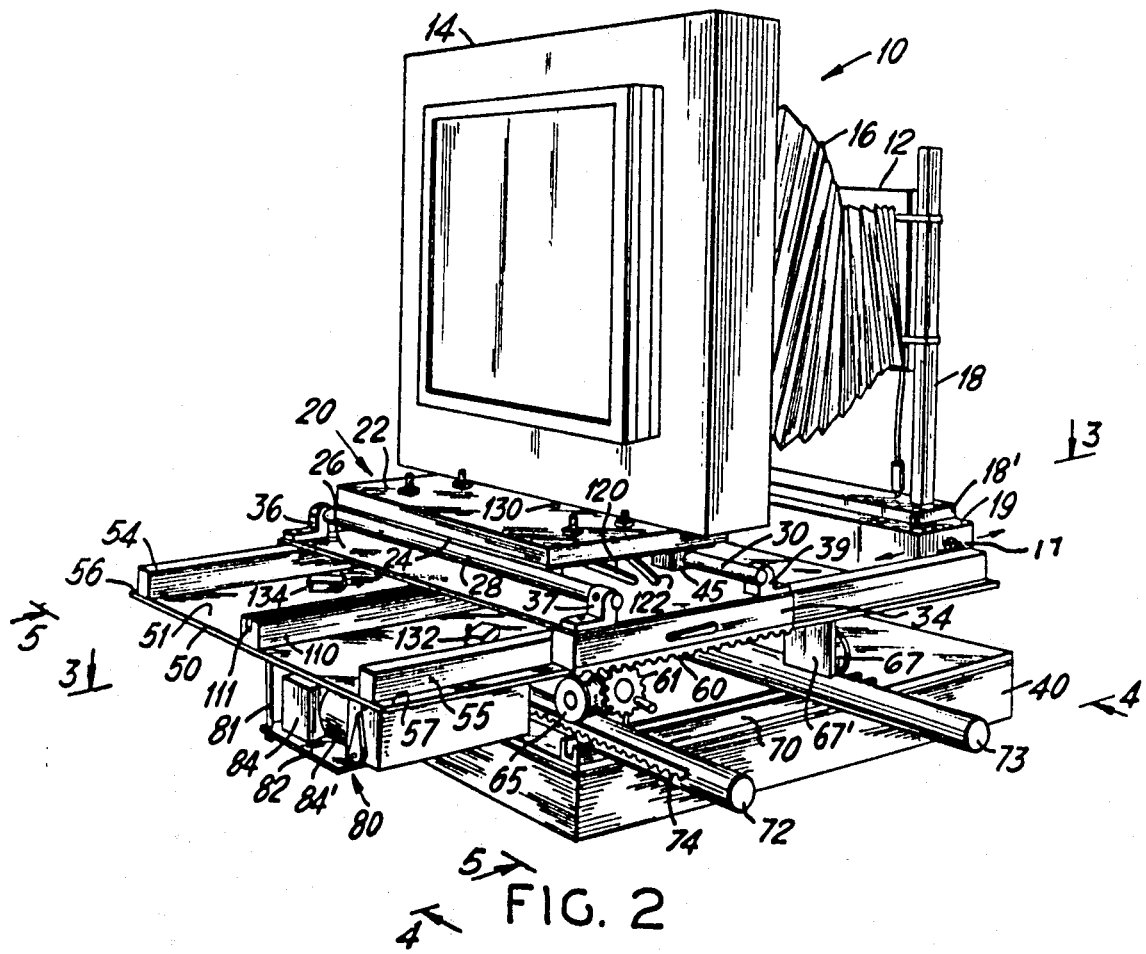
FIG. 2 is a perspective view of my three dimensional camera system.

Referring now to FIGS. 1 and 2, particularly FIG. 2, there are shown a camera 10 of conventional structure having a lens mount 12 for a lens 13 (FIG. 4), a movable, swingable film back 14 and an interconnecting bellows 16. The film back 14 is moved in a reverse arcuate path indicated by the letter P in FIG. 1. The film back and hence the film assume different orientations with respect to the subject indicated by the dotted outlines of the film back in FIG. 1. Each of these orientations will be referred to as a film aspect.

As stated previously, in stereoscopic photography, the film is successively exposed in different film aspects to form a multiplicity of images. The three dimensional effect is created because the multiple images are exposed through a lenticular screen 15 which is diagrammatically shown in FIG. 1.

The lenticular screen is a transparent sheet which may be self-supporting or may be formed integrally with the film. The lenticular comprises a plurality of small lenticules or lenses. This screen provides a plurality of images when receiving incident light from different aspects. A lineticular screen also possesses the property of providing a plurality of images from different aspects of incident light, but such aspects are limited to horizontal or vertical dispositions since the lineticular comprises lenses with a constant cross-section along one dimension. The lenticular screen thus resembles a grooved screen. As used herein, since lenticular screen includes a plurality of lens elements, it will be considered as including a lineticular. However, lineticular will not be deemed to include a lenticular.

It will be noted that the scan path P of FIG. 1 is substantially arcuate of reverse curvature or concave with respect to the subject. By reverse curvature, I mean that the radius of curvature R using the lens or a subject as a center is maximum at the outermost ends of the arc (Ends 1 and 2) and is minimum between the ends at the centermost region. Thus the film pack in following the reverse curvature path, actually twists as it moves. The flexibility of the bellows allows such twisting to occur.

One important purpose of this invention is to achieve this twisting effect by allowing the film pack to move in this reverse curvature path. I have found that the path is approximately 12 inches and the entire angle A is subtended as indicated in FIG. 1 approximately 22°.

The entire camera system has a much smaller traversal path and is also much smaller than prior cameras and may be readily transported for location shots.

The three dimensional effect is achieved and enhanced because the multiple aspects are each substantially different from one another although each aspect is relatively closer to the other than in prior systems. This eliminates substantial jumps in the background.

Figure 4:
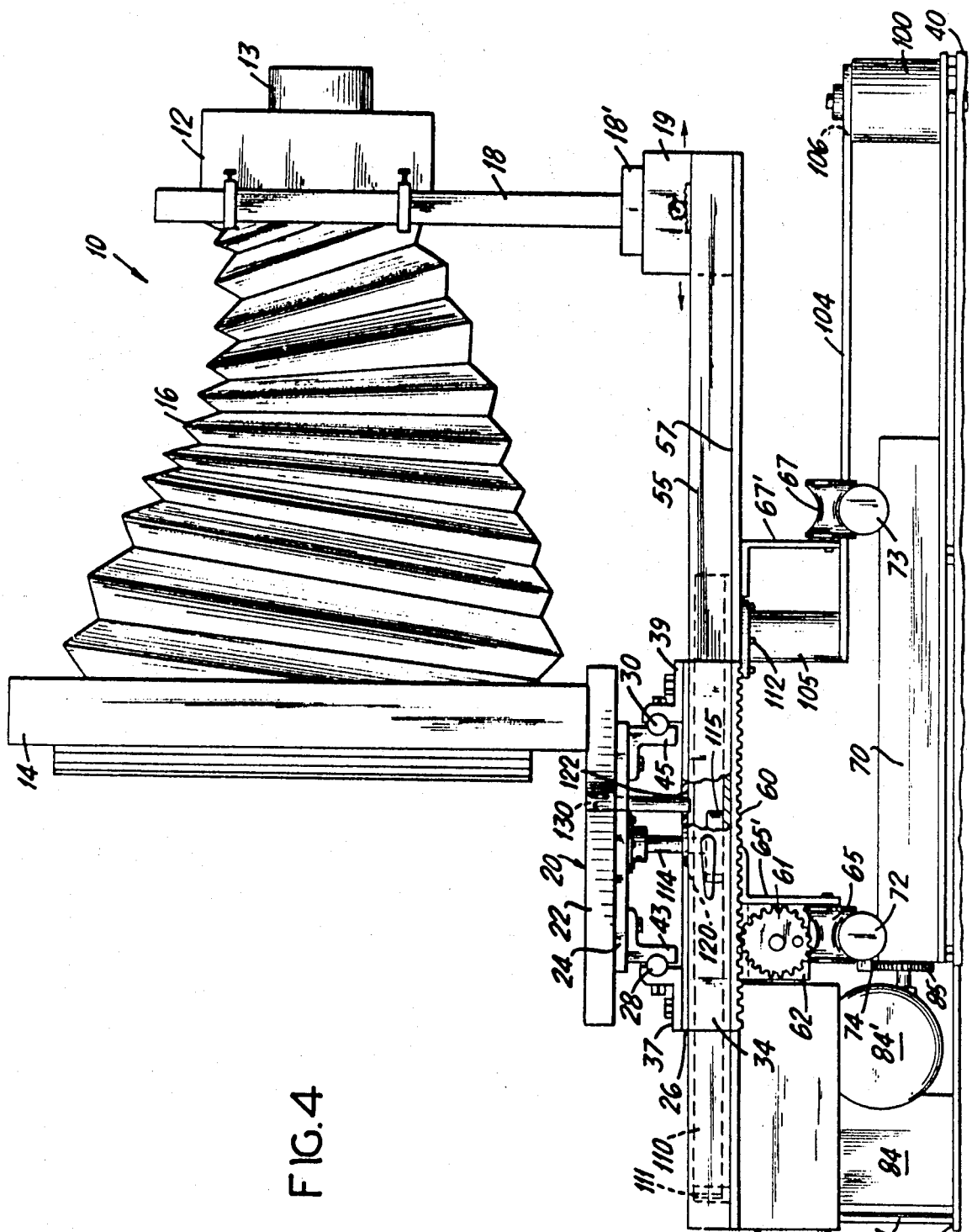
FIG. 4 is a vertical cross-sectional view along the lines 4-4 of FIG. 2 showing the system parts at the beginning of scan.

As shown in FIGS. 2 and 4, a driving means 84 including a drive motor and associated coupling elements, later described, moves the camera and camera backing. The motion imparted is essentially a lateral motion of the camera carriage as well as a reverse rotation of the swingable carriage plate 22 on which the film back is mounted.

The camera system comprises a middle carriage generally 20, a lower carriage 50 and a platform 40 on which the movable carriages are supported. The lower carriage 50 comprises a substantially flat member 51, a swingable bar 110 (FIGS. 2 and 3) having a longitudinal groove or channel 111 and upright sides 54 and 55. Sides 54 and 55 also serve as guides for the bottom 26 of middle carriage 20. Sides 54 and 55 are spaced so as to leave ledges 56 and 57 on member 51.

Figure 3:
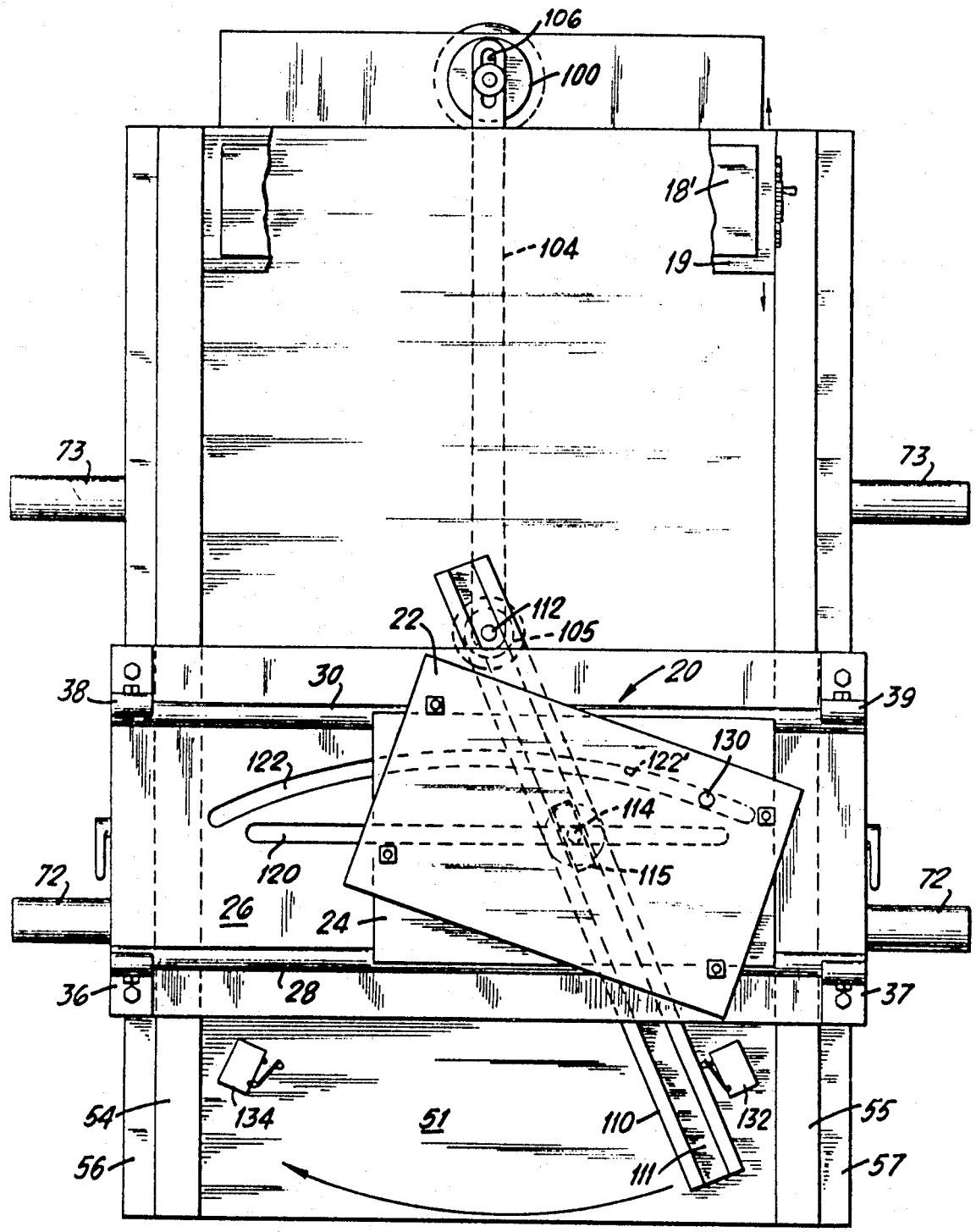
FIG. 3 is a plan view along the lines 3-3 of FIG. 2 with the camera removed showing the system parts at the beginning of scan.

The lens mount 12 is braced or otherwise attached to posts 18 the bottoms of which are supported in a block 19 carried on member 51 between sides 54 and 55. The middle carriage 20 which is guided by sides 54 and 55 for axial motion comprises an upper swingable carriage plate 22 and a reference carriage plate 24 (FIGS. 2, 3 and 4).

It will be seen that while swingable carriage plate 22 rotates with respect to its reference plate 24, both carriage plates are horizontally movable.

The bottom member 26 of carriage 20 comprises a flat plate having depending sides 33 and 34 so as to fit over upright sides 54 and 55, sides 33 and 34 being slideable along ledges 56 and 57.

Horizontal bars 28 and 30 are supported on carriage 20 by brackets 36, 37, 38 and 39. Guides 42, 43, 44 and 45 depend from the bottom of reference carriage plate 24 so that the latter may be moved across the bars 28, 30.

Figure 5:
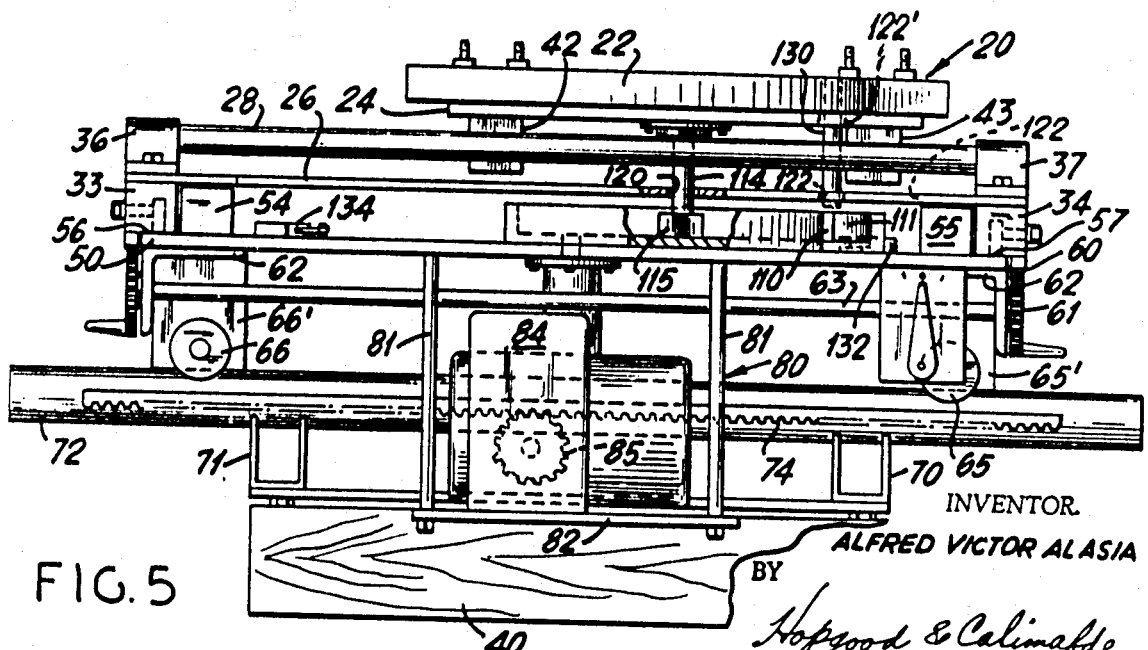
FIG. 5 is a front cross-sectional view along the lines 5-5 of FIG. 2 showing the system parts at the beginning of scan.

The lower surface of depending side 34 has teeth 60 formed therein to mesh with a geared handwheel 61 pivotally mounted on the bottom of the lower carriage 50 by brackets 62 and shaft 63 (FIG. 5). Rotation of handwheel 61 causes the middle carriage 20 to move axially and hence the film back 14 moves axially (to and away from the subject) for focusing.

Depending from the bottom of the lower carriage 50 are wheels or rollers 65, 66, 67 and 68, which are journalled to respective brackets 65', 66', 67', 68', (FIG. 5).

Platform 40 carries channel bars 70 and 71 on its upper surface (FIG. 2.), each channel having transverse grooves so that a pair of cylindrical tracks 72 and 73 can be seated therein. Rollers 65 and 66 roll on track 72 while rollers 67 and 68 roll on track 73. Tracks 72 and 73 are fixed mounted to the base.

As the entire camera is moving horizontally, the film back is moving in a reverse arc as described in connection with FIG. 1. The means for providing this reverse arcuate motion is described herein as being the preferred embodiment. As will be evident, the motion is provided by simple means, using few parts and in a reliable manner. However, other techniques and means may be used to provide this type of motion and I do not intend my invention to be limited to this preferred embodiment.

Suspended from the lower carriage 50 is a bracket structure comprising posts 81 and base 82 which carry the driving means 84. The driving means 84 includes a motor 84'.

Internally secured in bars 72 and 73 are racks 74 (FIG. 5). A gear 85 coupled to motor 84 drivingly engages rack 74 to move the bracket structure 80, motor 84 and wheels 65-68 horizontally. When the drive motor 84' rotates, gear 85 meshes with rack 74 to move the drive means 84 and the lower carriage 50 along tracks 72 and 73. The channel bar 110 is pivoted about a pin 112 (FIG. 3); the horizontal movement of the carriage 50 thus causes the channel bar to pivot.

It will be noted that the movement of the stand 18 moves the lens 13 in a horizontal direction. This amount of movement, however, is relatively small. For very critical focusing and pin pointing the pivotal point, I provide one or more longitudinal slots in the base 18' with suitable fixing or clamping elements to provide a fine control over the axial lens position.

The swingable bar 110 is coupled to a link 104 (FIGS. 3 and 4). The forward end of link 100 is coupled to a frame by a standard bushing, bolt and nut or other means indicated at 100. The link has a small slot 106 to provide a slight degree of axial control. The rearward end of link 104 has a coupling 105 to which pin 112 is attached to provide a pivot for bar 110.

The reverse arcuate movement of the swingable carriage plate 22 of FIG. 3 may now be described.

The groove 111 of the swingable bar 110 (FIGS. 1 and 3) constitutes a cam track. A cam 114 shaped as a pin extends downwardly from reference carriage plate 24 (FIG. 5) and carries a head 115 for reception in the cam track. Thus, when the bar 110 pivots, the head 115 slides therealong and moves horizontally.

A horizontal slot 120 and an arcuate slot 122 of reverse curvature are formed in the carriage plate 32 (FIG. 3).

Cam 114 extends through slot 120 and its head 115 is slideably received in cam groove 111 of bar 110. Thus when bar 110 swings leftwards as in FIG. 3, head 115 moves forwardly in groove 111 and the shaft of pin 114 moves horizontally in slot 120.

Another pin 130 (FIG. 5) is fixedly secured to and depends downwardly from swingable carriage plate 22. The rotation of carriage plate 22, and hence the reverse arcuate motion of the film back is determined by the relative orientation of pins 114 and 120. Such pins comprise elements of a positioning means and will be referred to herein as position pins.

The shaft of pin 130 slides in a slot 122' of the same shape as slot 122 formed in plate 24 (FIG. 3). The movement of bar 110 causes horizontal movement of both plates 22 and 24. Plate 22 is free to pivot about pin 114 and pin 130 moves in slots 122' and 122. Thus as pin 130 travels in the reverse arcuate path of slot 122, pin 114 moves horizontally along the path of slot 120. Since the distance between pins 114 and 130 varies during slot traversal, the swingable carriage plate 22 swings in the reverse arc, pin 130 essentially rotating about pin 114. Thus, the orientation of the positioned pins determine the orientation of plate 22. Since the film back is supported on swingable carriage plate as suggested by the extending screws, the film back follows the same path. In order to vary the center of depth of the entire picture, a fine control 17 (FIG. 2) is shown to suggest the longitudinal movement of the block 19 carrying the lens. This control improves the overall quality of the picture. Electrical means may be used to turn the drive means motors on and off.

The shutter is opened and closed by controlling the positions of microswitches 132 and 134 (FIG. 3). Electrical control of a shutter is conventional so that the details of the shutter circuitry is not required. Microswitch 132 mounted on reference carriage 50 is shown as being normally closed. When bar 110 starts its traversal path, microswitch 132 is opened. Microswitch 132 can be adjusted to correct for under or over scanning. Another microswitch 134 may be mounted on horizontal member 50 which closes when its sensing contact is closed by bar 110 to close the shutter.

The simple "box" camera shown in FIG. 6a comprises a housing 200, lens 202 and film 204 (FIG. 6b). The shutter is the focal plane type comprising a horizontally scanning vertical slit. This slit is designated as 206. So much of the camera is conventional and need not be described in detail. A lenticular screen 210 is secured in front of the film 210.

The lens as formed has a generally horizontal slit shape so that in combination with the traveling vertical aperture, a small vertical lens is moved across a predetermined arcuate path. Although a lineticular may be used, the lenticular having the multiple lenticules is preferred to provide shorter exposure and to prevent parasite images. The lens 202 is conventionally circular in shape, but has maskings so that only a relatively small horizontal lens 216 wedge is formed so that light can pass.

As shown in the camera of FIG. 7a, a lens wedge is a generally flat lens segment (FIG. 7b) having a smaller horizontal exposed section 218 and slit 206. Thus, in the simple box camera, the shutter creates a scanning effect so that multiple image aspects are formed on the film through the lenticular.

While I have described above the principles of my invention in connection with specific apparatus, it is to be clearly understood that this description is made only by way of example and not as a limitation to the scope of my invention as set forth in the objects thereof and in the accompanying claims.

I claim:

1. An apparatus for stereoscopic photography with a camera having a movable film holder and camera lens, and comprising
 means for moving said film holder in a predetermined reverse scan path with respect to the camera lens and being generally concave with respect to a subject, said scan path being defined by an arc, such that the distance between any point on said arc and said lens, substantially, is greatest at the ends of said arc and decreases to a minimum at a region in the intermediate portion of said arc, said film holder carrying film having lenticular means in front thereof and movable in conjunction with said film.

2. The camera of Claim 1 including means for controllably adjusting the axial position of the lens relative to the film back to vary the center of depth of the desired picture.

3. Apparatus for steroscopic photography with a camera having an objective lens and a movable film holder for holding a lenticular screen and a photographic film in fixed relation parallel to one another, said apparatus including means for moving said film holder along a reverse scan path with respect to said lens, said path being an arc such that the distance between said lens and any point on said arc is greatest at the ends of said arc and decreases to a minimum at a region in the intermediate portion of said arc.

4. The apparatus of Claim 3 including reference carriage means for moving the said film holder forwardly and transversely.

5. The apparatus of Claim 4 including a reference plate on said reference carriage means, pivotal means coupled to said reference plate for pivotal movement therewith, said film holder being coupled to said pivotal means for simultaneous movement therewith, said pivotal means including guide means coupled to said reference carriage means for providing reverse scan path movement.

6. The apparatus of Claim 5 in which said pivotal means includes an elongated cam track means mounted for slidable, pivotal movement with respect to said reference carriage means, a pivoting plate coupled to said reference plate, said reference plate and pivoting plate being coupled to said elongated means to provide horizontal movement of said reference plate and pivotal movement of said pivoting plate upon pivotal movement of said elongated means.

7. The apparatus of Claim 6 in which said reference plate has two tracks and said pivoting plate has two cam follower elements coupled to the track, one of said follower elements also being coupled to said elongated means, said tracks having different contours to provide reverse arcuate movement of said film holder whereby said reference plate and film holder move relative to each other when said elongated means pivot.

8. The apparatus of Claim 7 in which one of said tracks is relatively straight and the other is arcuate, and in which said two cam elements comprise fixed position pins, whereby the movement of said pins in said tracks causes pivoting of said pivotal plate.

9. An apparatus for stereoscopic photography with a camera having a movable film holder and camera lens, and including means for moving said film holder in a predetermined reverse scan path with respect to the camera lens and being generally convex with respect to a subject, said scan path being defined by an arc, such that the distance between any point on said arc and a subject, substantially, is greatest at the ends of said arc and decrease to a minimum at a region in the intermediate portion of said arc.

10. An apparatus for stereoscopically photographing a subject comprising:

a camera;

film means for said camera;

lenticular means in front of said film means;

lens means including shutter means;

means causing one of said lens means and said film means to move in a reverse arcuate path, said reverse arcuate path being defined by an arc the ends of which are at a distance greatest from said subject and, the center of said arc being closest to said subject.

11. A process for obtaining stereoscopic pictures in which a series of exposures are made onto a film through a lenticular screen by moving the film orientation with respect to the subject so as to obtain a series of viewing aspects for each respective exposure, comprising the step of moving said film in a scan path of reverse curvature with respect to said lens during exposure, said scan path being defined by an arc, such that the distance between any point on said arc and said subject is greatest at the ends of said arc and decreases to a minimum at a region in the intermediate portion of said arc.